United States Patent Office 3,283,021
Patented Nov. 1, 1966

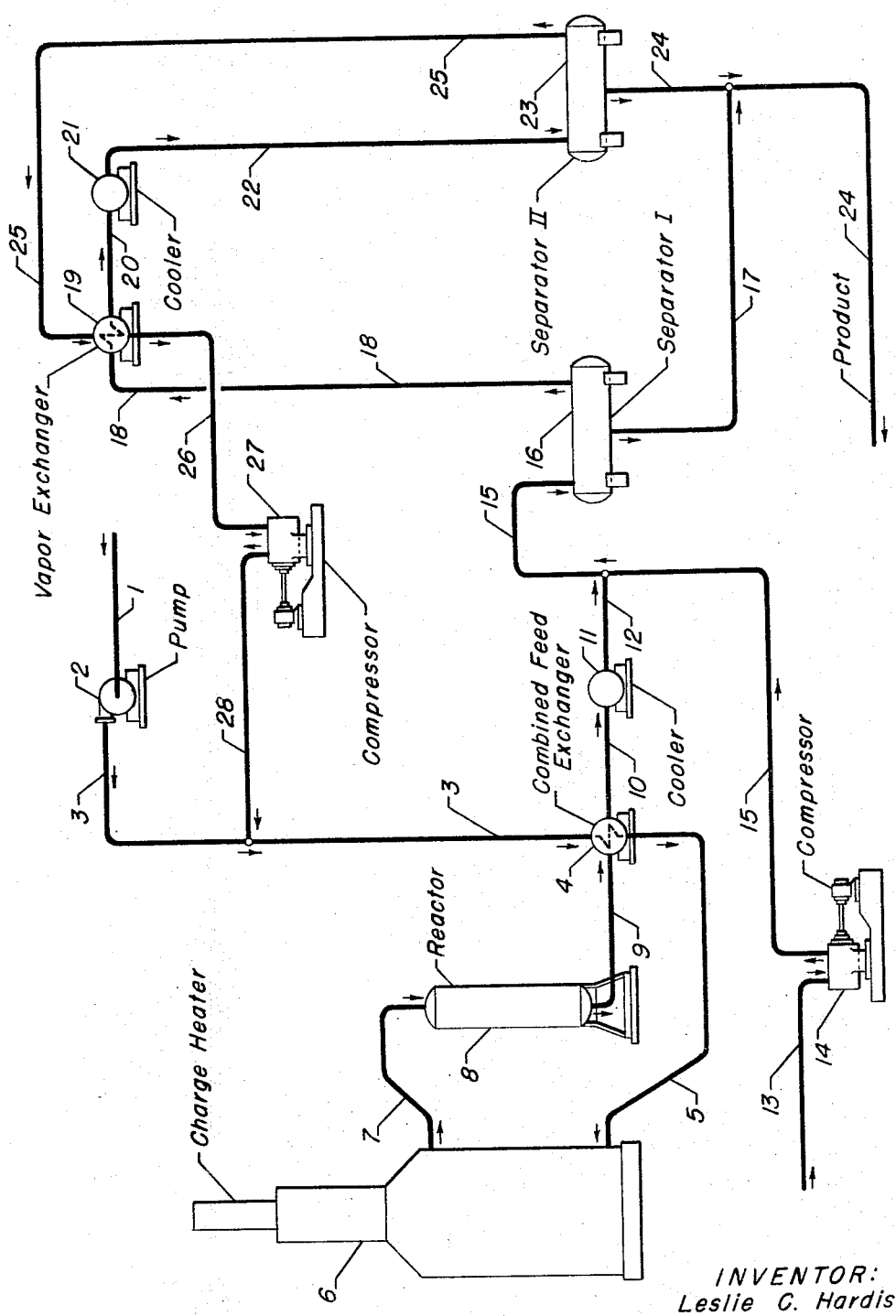

3,283,021
HYDROCARBON CONVERSION PROCESS
Leslie C. Hardison, Arlington Heights, Ill., assignor to Universal Oil Products Company, Des Plaines, Ill., a corporation of Delaware
Filed Aug. 15, 1963, Ser. No. 302,347
6 Claims. (Cl. 260—666)

This invention relates to a hydrocarbon conversion process and more particularly relates to a combination process including the steps of hydrocarbon conversion, gas-liquid separation, refrigeration and a method for upgrading and maximizing the hydrogen content of hydrogen recycle gas in such a process.

In recent years, with the advances in the automotive industry, fuels of relatively high octane ratings have been found necessary to satisfy high compression ratio engines. Many methods have been provided for the production of such high anti-knock fuels. These methods include such processes as alkylation, reforming, catalytic cracking, and high temperature thermal reforming and thermal cracking operations. Other processes, which may in one sense be considered auxiliary, were developed, such as, for example, isomerization, which was employed to produce isoparaffins which subsequently were reacted with olefins to form a high anti-knock motor fuel fraction. In addition to the production of one of the reactants for paraffin alkylation, isomerization was also utilized to increase the antiknock quality of saturated hydrocarbons such as paraffins and naphthenes found in selected fractions of gasolines and/or naphthas. An example of the latter type of operation is a process to produce isopentane and/or isohexanes which subsequently may be employed as blending agents in automotive and aviation fuels.

In most hydrocarobn conversion processes, and especially in the above-mentioned isomerization process, catalytic agents have been employed to effect desired molecular rearrangement. Ordinarily, these catalytic agents have consisted of metal halides, such as aluminum chloride, aluminum bromide, etc., which have been activated by the addition of the corresponding hydrogen halide. These catalytic materials are initially very active and effect high conversions per pass at relatively low temperature. However, the activity of these catalysts is so high that the catalysts accelerate decomposition reactions as well as isomerization reactions with the result that the ultimate yield of isomerized product is reduced. These decomposition or cracking reactions also considerably increase catalyst consumption by the reaction of the fragmental material with the catalytic agent to form sludge-like material. In spite of what might have been predicted, these decomposition or cracking reactions cannot be reduced by simply decreasing reaction zone severity as, for example, by lowering the reaction zone temperature or by increasing the space velocity of the reactants through the reaction zone. At temperatures and space velocities at which satisfactory isomerization reactions are obtained, these decomposition reactions are pronounced. Various extraneous means have been utilized in an attempt to decrease or eliminate these decomposition or cracking reactions. Such means have included the use of hydrogen along with passage of the reactants to the reaction zone, or the addition of various compounds to the reaction zone feed, said compounds being classified as cracking suppressors. While the use of hydrogen and/or these cracking suppressors along with these conventional isomerization catalysts have resulted in operability of these processes, such processes have not gained wide-spread acceptance in the petroleum refining industry. This lack of wide-spread acceptance is due to relatively low ultimate yields and high catalyst consumption which have not been satisfactorily eliminated by these means.

More recently, the use of so-called dual function catalysts has been disclosed for hydrocarbon conversion processes in the petroleum refining industry. These dual function catalysts include, in general, a hydrogenation component and an acid-acting support. The use of hydrogen along with the hydrocarbons to be converted has been disclosed for these catalysts. Processes for which these catalysts have been disclosed have been relatively high temperature processes and the function of the hydrogen in such processes has been described as one of suppression of coke formation. The most successful application of such catalysts up to the present time has been for the catalytic reforming of gasoline or naphtha boiling range hydrocarbons. Still more recently, the use of such catalysts has been disclosed for so-called hydroisomerization processes. Instead of utilizing wide boiling range feed stocks, these processes have been successfully applied to relatively narrow boiling range feed stocks under operating conditions to obtain hydroisomerization. The use of these narrower boiling range feed stocks has allowed the concurrent use therewith of milder operating conditions than necessary for reforming. However, such hydroisomerization processes still demand the concurrent use of hydrogen, not only to keep the surface of the catalyst clean and free from coke, but also because it was felt that the hydrogen plays an important part in the hydroismerization reaction mechanism.

At the same time, in a commercial refinery flow scheme, it is both practical and economical to utilize as many off-gas streams from the various refinery units as possible. Thus, when a refinery has a hydrogen-containing gas stream, for example, from a reforming processes, it may successfully be utilized in the process of the present invention, since, by my process, the hydrogen content of the hydrogen-containing makeup gas to the hydrocarbon conversion reaction zone will be upgraded and maximized at a relatively low cost thereby eliminating the need for an outside source of high purity hydrogen. In this manner, as hereinafter described, the recycle gas to the hydrocarbon conversion reaction zone will always contain a greater proportion of hydrogen than does the hydrogen-containing makeup gas stream to the hydrocarbon conversion process from another refinery unit. This and other features of the process of the present invention will be set forth hereinafter in detail.

In one embodiment, this invention relates to a process for the conversion of a hydrocarbon in the presence of hydrogen and a conversion catalyst which comprises passing to a reaction zone containing said conversion catalyst said hydrocarbon in combination with a hydrogen-rich vapor phase fraction produced as hereinafter described, converting at least a portion of said hydrocarbon at conversion conditions, passing the reaction zone effluent in admixture with a hydrogen-containing make-up gas stream to a first separation zone, separating from said first separation zone a liquid phase fraction enriched in converted hydrocarbons and a vapor phase fraction, passing said vapor phase fraction to refrigeration means, passing the refrigerated vapor phase fraction to a second separation zone, separating from said second separation zone a liquid phase fraction enriched in converted hydrocarbons and a hydrogen-rich vapor phase fraction, commingling the liquid phase fractions enriched in converted hydrocarbons from the first and second separation zones, removing the commingled liquid phase fraction enriched in converted hydrocarbons as product from the process, and recycling said hydrogen-rich vapor phase fraction from said second separation zone in combination with said hydrocarbon to said conversion zone as aforesaid.

In another embodiment, this invention relates to a process for the isomerization of an isomerizable hydrocarbon at isomerization conditions in the presence of hydrogen and an isomerization catalyst which comprises passing to an isomerization zone containing said isomerization catalyst said isomerizable hydrocarbon in combination with a hydrogen-rich vapor phase fraction produced as hereinafter described, isomerizing at least a portion of said isomerizable hydrocarbon, passing the isomerization zone effluent in admixture with a hydrogen-containing makeup gas stream to a first separation zone, separating from said first separation zone a liquid phase fraction enriched in isomerized hydrocarbons and a vapor phase fraction, passing said vapor phase fraction to refrigeration means, passing the refrigerated vapor phase fraction to a second separation zone, separating from said second separation zone a liquid phase fraction enriched in isomerized hydrocarbons and a hydrogen-rich vapor phase fraction, commingling the liquid phase fractions enriched in isomerized hydrocarbons from the first and second separation zones, removing the commingled liquid phase fraction enriched in isomerized hydrocarbons as product from the process, and recycling said hydrogen-rich vapor phase fraction from said second separation zone in combination with said isomerizable hydrocarbon to said isomerization zone as aforesaid.

In still another embodiment, this invention relates to a process for the isomerization of an isomerizable saturated hydrocarbon at isomerization conditions in the presence of hydrogen and an isomerization catalyst which comprises passing to an isomerization zone containing said isomerization catalyst said isomerizable saturated hydrocarbon in combination with a hydrogen-rich vapor phase fraction produced as hereinafter described, isomerizing at least a portion of said isomerizable saturated hydrocarbon, passing the isomerization zone effluent in admixture with a hydrogen-containing makeup gas stream to a first separation zone, separating from said first separation zone a liquid phase fraction enriched in isomerized hydrocarbons and a vapor phase fraction, passing said vapor phase fraction to refrigeration means, passing the refrigerated vapor phase fraction to a second separation zone, separating from said second separation zone a liquid phase fraction enriched in isomerized hydrocarbons and a hydrogen-rich vapor phase fraction, commingling the liquid phase fractions enriched in isomerized hydrocarbons from the first and second separation zones, removing the commingled liquid phase fraction enriched in isomerized hydrocarbons as product from the process, and recycling said hydrogen-rich vapor phase fraction from said second separation zone in combination with said isomerizable saturated hydrocarbon to said isomerization zone as aforesaid.

In a further embodiment, this invention relates to a process for the isomerization of an isomerizable acyclic paraffin hydrocarbon at isomerization conditions in the presence of hydrogen and an isomerization catalyst which comprises passing to an isomerization zone containing said isomerization catalyst said isomerizable acyclic paraffin hydrocarbon in combination with a hydrogen-rich vapor phase fraction produced as hereinafter described, isomerizing at least a portion of said isomerizable acyclic paraffin hydrocarbon, passing the isomerization zone effluent in admixture with a hydrogen-containing makeup gas stream to a first separation zone, separating from said first separation zone a liquid phase fraction enriched in isomerized hydrocarbons and a vapor phase fraction, passing said vapor phase fraction to refrigeration means, passing the refrigerated vapor phase fraction to a second separation zone, separating from said second separation zone a liquid phase fraction enriched in isomerized hydrocarbons and a hydrogen-rich vapor phase fraction, commingling the liquid phase fractions enriched in isomerized hydrocarbons from the first and second separation zones, removing the commingled liquid phase fraction enriched in isomerized hydrocarbons as product from the process, and recycling said hydrogen-rich vapor phase fraction from said second separation zone in combination with said isomerizable acyclic paraffin hydrocarbons to said isomerization zone as aforesaid.

In a more specific embodiment, this invention relates to a process for the isomerization of normal pentane at isomerization conditions in the presence of hydrogen and an isomerization catalyst which comprises passing to an isomerization zone containing said isomerization catalyst said normal pentane in combination with a hydrogen-rich vapor phase fraction produced as hereinafter described, isomerizing at least a portion of said normal pentane, passing the isomerization zone effluent in admixture with a hydrogen-containing makeup gas stream to a first separation zone, separating from said first separation zone a liquid phase fraction enriched in isomerized hydrocarbons and a vapor phase fraction, passing said vapor phase fraction to refrigeration means, passing the refrigerated vapor phase fraction to a second separation zone, separating from said second separation zone a liquid phase fraction enriched in isomerized hydrocarbons and a hydrogen-rich vapor phase fraction, commingling the liquid phase fractions enriched in isomerized hydrocarbons from the first and second separation zones, removing the commingled liquid phase fraction enriched in isomerized hydrocarbons as product from the process, and recycling said hydrogen-rich vapor phase fraction from said second separation zone in combination with said normal pentane to said isomerization zone as aforesaid.

The process of the present invention can perhaps be best understood by reference to the accompanying drawing which is a schematic diagram of the process flow. While of necessity, certain limitations must be present in such a schematic description, no intention is meant thereby to limit the generally broad scope of this invention. As stated hereinabove, the process of this invention is applicable for the conversion of a hydrocarbon in the presence of hydrogen and a conversion catalyst. The process of this invention is particularly applicable to the isomerization of saturated hydrocarbons including acyclic paraffins and cyclic naphthenes, and is particularly suitable for the isomerization of straight chain or less highly branched chain paraffins containing four or more carbon atoms per molecule including normal butane, normal pentane, normal hexane, 2-methylpentane, 3-methylpentane normal heptane, 2-methylhexane, 3-methylhexane, normal octane, 2-methylheptane, 3-methylheptane, 4-methylheptane, etc. Cycloparaffins or naphthenes which may be utilized in the process of this invention should contain at least 6 carbon atoms and 5 carbon atoms in the ring such as the alkylcyclopentanes and cyclohexanes and include methylcyclopentane, cyclohexane, 1,1-dimethylcyclopentane, 1,2-dimethylcyclopentane, 1,-3-dimethylcyclopentane, methylcyclohexane, 1,1-dimethylcyclohexane, 1,2-dimethylcyclohexane, etc. This process is also applicable to the conversion of mixtures of paraffins and/or naphthenes such as those derived by selective fractionation of straight run or natural gasolines or naphthas. Such mixtures of paraffins and/or naphthenes include so-called pentane fractions, hexane fractions, heptane fractions, etc., and mixtures thereof. The process of this invention is also applicable to the isomerization of olefins, for example, the isomerization of 1-butene to 2-butene, the isomerization of 3-methyl-1-butene to 2-methyl-2-butene, etc., although obviously not necessarily under the same conditions of operation since the tendency of these olefins to be hydrogenated in the presence of hydrogen and the catalyst must be overcome. The process may also be used for the isomerization of alkyl-aromatic hydrocarbons, for example, the isomerization of ethylbenzene to xylenes, the isomerization of n-propylbenzene to methylethylbenzene, etc., as well as in any hydrocarbon conversion process such as hydrorefining, hydrocracking and the like that utilizes hydrogen in the conversion zone since the process of the present invention, as hereinbefore stated, upgrades and maximizes the hydrogen content of a hydrogen-containing gas stream that would be found in a commercial refinery or petrochemical complex.

As stated hereinabove, the first step of the process of the present invention comprises converting at least a portion of the hydrocarbon in the presence of hydrogen and a conversion catalyst in a reaction zone. In the drawing, this first step is represented as taking place in reaction zone 8, labeled reactor. In the drawing, the hydrocarbon is represented as being furnished to reaction zone 8 via line 1 to pump 2 via line 3 to combined feed heat exchanger 4 hereinafter described, and then via line 5 to charge heater 6. When the charge is heated to the desired temperature, the hydrocarbon is passed via line 7 to reaction zone 8. Prior to passage through the reaction zone, a hydrogen-rich vapor phase fraction is combined with the hydrocarbon feed via lines 28 and 3 as hereinafter set forth.

Reaction zone 8 is of the conventional type with a conversion catalyst disposed therein in the reaction zone. The reaction zone may be equipped with heat transfer means, baffles, trays, heating means, etc. The reaction zone is preferably of the adiabatic type and thus feed to the reaction zone will preferably be provided with the requisite amount of heat prior to passage thereof to said reaction zone. This requisite amount of heat is furnished by heat transfer means in combined feed exchanger 4 and by charge heater 6. The actual operation of the reaction zone may be either upflow or downflow. A preferred hydrocarbon conversion catalyst which may be utilized in the process of the present invention comprises a refractory oxide, a platinum group metal, and combined halogen. The refractory oxide is a solid and may be selected from diverse oxides which are not necessarily equivalent for use as so-called supports in preparing this catalyst. Among suitable refractory oxides are such various substances as silica, alumina, titanium dioxide, zirconium dioxide, chromia, zinc oxide, silica-alumna, silica-magnesia, silica-alumina-magnesia, chromia-alumina, alumina-boria, silica-zirconia, etc., and various naturally occurring refractory oxides of varying degrees of purity such as bauxite, kaolin, or bentonite clay (which may or may not have been acid treated), diatomaceous earths such as kieselguhr, montmorillonite, spinels such as magnesia-alumina or zinc oxide spinels, etc. Of the above-mentioned refractory oxides, alumina is preferred and particularly preferred is synethetically prepared substantially anhydrous gamma-alumina of a high degree of purity and characterized by having a high surface area. By the term "high surface area" is meant a surface area measured by surface adsorption techniques within the range of from about 25 to about 500 or more square meters per gram and preferably a support having a surface area of approximately 100 to 300 square meters per gram.

In the present specification, the term alumina is employed to mean porous aluminum oxide in all states of hydration, as well as aluminum hydroxide. The alumina may be synthetically prepared or naturally occurring and it may be of the crystalline or gel type. Whatever type of alumina is employed, it may be activated prior to use by one or more treatments including treatment with acids, alkalis, or other chemical compounds, or by treatments such as drying, calcining, steam, etc. It may be in the form known as activated alumina, activated alumina of commerce, porous alumina, alumina gel, etc. The various forms of alumina are known by many trade names and it is intended to include all such forms. The typical aluminas hereinabove described are intended as illustrative rather than limiting on the scope of the present invention.

In the preferred catalyst utilized in the process of the present invention, the above-mentioned refractory oxides have composited therewith a platinum group metal and combined halogen as hereinabove set forth. By a platinum group metal is meant a noble metal, excluding silver and gold, and selected from the group consisting of platinum, palladium, ruthenium, rhodium, osmium and iridium. These metals are not necessarily equivalent in activity in the catalyst utilized in the process of the present invention and of these metals, platinum and palladium are preferred, and platinum is particularly preferred. With the solid composite of refractory oxide and a platinum group metal for use as the catalyst in the process of the present invention is associated what is known in the art as combined halogen. In general, the combined halogen is present in an amount of from about 0.01 to about 8% by weight based on the dry support, the combined halogen preferably being selected from fluorine and chlorine. As will be set forth hereinafter in detail, the combined halogen preferably is fluorine and in an amount of from about 2.0 to about 5.0% by weight based on the dry support.

The preferred conversion catalyst composition comprises alumina, platinum, and from about 2.0 to about 5.0% by weight combined fluorine. As stated hereinabove, the alumina is preferably synthetically prepared gamma-alumina of a high degree of purity and characterized by having a high surface area. The methods of preparation of such synthetic gamma-aluminas are well known. For example, they may be prepared by the calcination of alumina gels which are commonly formed by adding a suitable reagent such as ammonium hydroxide, ammonium carbonate, etc., to a solution of a salt of aluminum, such as aluminum chloride, aluminum sulfate, aluminum nitrate, etc., in an amount to form an aluminum hydroxide gel which on drying and calcination is converted to gamma-alumina. It has been found that aluminum chloride is generally preferred as the aluminum salt, not only for convenience in subsequent washing and filtering procedures, but also because it appears to give the best results. Alumina gels may also be prepared by the reaction of sodium aluminate with a suitable acetic reagent to cause precipitation thereof with the resultant formation of an aluminum hydroxide gel. Synthetic aluminas may also be prepared by the reaction of metallic aluminum with hydrochloric acid, acetic acid, etc., which sols can be gelled with suitable precipitation agents such as ammonium hydroxide, followed by drying, and calcination. The fluorine in an amount of from about 2.0 to about 5.0% can be incorporated into the alumina in any suitable manner, for example, by the addition of a suitable quantity of hydrofluoric acid to an alumina sol or alumina gel prior to drying and calcination thereof. In another manner, aluminum fluoride in the desired amount can be added to alumina gels thus yielding an alumina having the desired quantity of fluorine combined therewith. In any of the above instances, whether the alumina is prepared from an alumina sol or an alumina gel, the resultant product is calcined to a sufficient temperature to convert the product into gamma-alumina. While such resultant aluminas may contain relatively small amounts of water of hydration, gamma-alumina containing from about 2.0 to about 5.0% by weight combined fluorine is the preferred synthetically prepared alumina containing combined halogen for use in the preparation of the finished conversion catalyst for use in the process of the present invention.

The preferred synthetically prepared alumina containing 2.0 to about 5.0% by weight combined fluorine, as hereinabove set forth, then has a platinum group metal combined therewith. This platinum group metal, particularly platinum, may be composited with the alumina in any of the well-known methods. For example, an ammoniacal solution of chloroplatinic acid may be admixed with the halogenated alumina followed by drying and calcination. In another method, chloroplatinic acid in the desired quantity can be added to an alumina gel slurry followed by the precipitation of the platinum therefrom by means of hydrogen sulfide or another sulfiding agent. In still another method, the platinum can be coprecipitated with the alumina gel, for example, by introduction of a suitable platinum compound into an alumina sol followed by the addition of a precipitation agent thereto. In another method, chloroplatinic acid can be dissolved in dilute acid or mixed acid solutions, for example, hydrochoric acid, nitric acid, sulfuric acid, hydrochloric acid plus nitric acid, etc. and these resultant solutions utilized for impregnation. Obviously, the acid strength of said solutions must be controlled to prevent attack and/or solution of the alumina by the acid. While the amount of platinum compounded with the halogenated alumina is not critical, for economic reasons this amount of platinum is usually kept at a minimum. Thus, large amounts of platinum do not cause a detrimental effect. However, it is generally preferred to utilize from about 0.01% to about 2% by weight of platinum based on the dry alumina.

While the form of the refractory oxides, platinum group metal, combined halogen composite is not critical, it is generally preferred to utilize macro size particles so that the total composite may be utilized as a fixed bed within the reaction zone. Thus, it is desirable to form the synthetically prepared alumina either before or after the platinum is composited therewith into particles, for example, of 1/16" x 1/16" or 1/8" x 1/8", etc. This can be accomplished in one manner by grinding the dried halogenated alumina and pilling the resultant product with an organic binder such as stearic acid by known techniques followed by calcination. Alternately, the particles may be in the form of spheres from spray drying or dropping, or they may be in the form of irregularly shaped particles such as result from extrusion. While it is not meant to limit the invention to particles of any particular size nor to any particular hydrocarbon conversion catalyst, the above-mentioned alumina-platinum-fluorine conversion catalyst composites are definitely preferred.

After the platinum in the desired concentration has been fixed on the alumina, the mixture is preferably dried at a temperature of from about 100° to about 200° C. for a period of from about ½ to about 24 hours, then the catalyst may be subjected to high temperature treatment, which usually consists of calcination in air. The preferred oxidation method is to subject the catalyst to calcination in air at a temperature of from about 425° C. to about 650° C. for a period of from about 2 to about 8 hours or more. After such drying and oxidation treatment, the resultant composite is a catalyst for the conversion of hydrocarbons as set forth hereinabove.

The hydrocarbon conversion process may be carried out at varying conditions of temperature, pressure and liquid hourly space velocity. The temperature utilized will generally be dictated by the particular hydrocarbon conversion process and the particular hydrocarbon conversion catalyst utilized and therefore temperatures will be in the range of from about 100° C. to about 800° C. or more. In a hydrocarbon conversion process such as isomerization, a preferred temperature range will be from about 100° C. to about 500° C. The pressure selected for the hydrocarbon conversion reaction zone will be low enough so as to insure vapor operation of the hydrocarbon conversion reaction zone feed and this pressure will range from about atmospheric pressure to about 350 atmospheres or more. The liquid hourly space velocity (which may be defined as the ratio of liquid volume of inlet material to the volume of the reaction space) will range from about 0.25 to about 100, preferably within the range of from about 1.0 to about 20, the only limitation being that equilibrium mixtures of converted hydrocarbons are obtained in the reaction zone effluent. As set forth hereinabove, hydrogen is utilized to minimize cracking and to maintain the surface of the catalyst in a carbon-free condition in, for example, isomerization processes. The quantity of hydrogen utilized will range from about 0.25 to about 10 moles or more of hydrogen per mole of hydrocarbon. The hydrogen consumption will usually be exceedingly small, in the range of about 30 to about 100 cubic feet per barrel of hydrocarbon feed in such processes, but hydrogen consumption may be much larger in other hydrocarbon conversion processes where hydrogen is consumed in the process.

Prior art processes indicate that hydrogen can be supplied from any convenient source and will generally be recycled within the process. Prior art processes also indicate that the hydrogen utilized may be purified or may be diluted with various inert materials such as nitrogen, methane, ethane, and/or propane, but these purification and/or dilution steps are carried out outside the process flow scheme and are not an integral part of the process. However, I have found that upgrading and maximizing the hydrogen content of the make-up gas furnished to the process within the process itself is both economical and advantageous since hydrogen purification facilities outside the process itself are not required and operating costs are significantly decreased while at the same time the hydrocarbon conversion process is operating at its maximum efficiency due to the upgraded hydrogen-rich recycle gas stream that is passed first to the reactor, and then to the balance of the process as hereinafter described.

When the hydrocarbon conversion reaction has proceeded to the desired extent in reactor 8, preferably, though not necessarily, with 100% conversion of the hydrocarbon, the products from the reaction zone which may be termed reaction zone effluent, pass from hydrocarbon conversion reaction zone 8 via line 9 through combined feed heat exchanger 4.

In combined feed heat exchanger 4, hydrocarbon feed from storage or another processing unit is passed, as hereinbefore set forth, via lines 1 and 3 to the combined feed heat exchanger. This feed is usually at ambient temperature if from storage or at a slightly elevated temperature if from another processing unit and by heat transfer with the reaction zone effluent via line 9 is preheated before the hydrocarbon feed enters charge heater 6. At the same time, the reaction zone effluent from line 9 is cooled thus effecting economy of operation during the processing step. Combined feed heat exchanger 4 will be sized so as to effect a decrease in temperature of the reaction zone effluent from line 9 before it passes via line 10 to condenser 11, labeled cooler. The reaction zone effluent passed through cooler 11 further cools the reaction zone effluent to the desired processing temperature before the reaction zone effluent passes via line 12 to admixing with a hydrogen-containing make-up gas stream in line 15 as hereinafter described.

A hydrogen-containing make-up gas stream is then withdrawn from another unit in the refinery or petrochemical complex and utilized as the source of hydrogen in the process of the present invention. The hydrogen-containing make-up gas stream is passed via line 13 to booster compressor 14 and then via line 15 to separator 16, labeled separator I. The reaction zone effluent via line 12 is admixed, as hereinbefore set forth, with the hydrogen-containing make-up gas stream in line 15 and passed in admixture to the first separation zone. In separator I, a liquid phase fraction enriched in converted hydrocarbons and a vapor phase fraction are separated. Separtor I is usually run at a pressure 50 p.s.i.g. lower than the reactor pressure and at a temperature of about 35° C. to 40° C. The liquid phase fraction enriched in converted hydrocarbons is passed via line 17 from separator I to line 24 as hereinafter described.

The vapor phase fraction from separator I is passed via line 18 to vapor exchanger 19, hereinafter described, via line 20 to refrigeration means 21, labeled cooler. The refrigerated vapor phase fraction is then passed via line 22 to separation zone 23 labeled separator II. In separator II, a liquid phase fraction enriched in converted hydrocarbons and a hydrogen-rich vapor phase fraction are then separated. Separtor II is maintained at about the same operating pressure as separator I but at a much lower temperature. Operating temperatures of less than about 5° C. are preferred. The liquid phase fraction enriched in converted hydrocarbons is then withdrawn via line 24 and commingled with the liquid phase fraction from the first separation zone and removed from the process via line 24 as product from the process. The hydrogen-rich vapor phase fraction is withdrawn via line 25 and recycled through vapor exchanger 19 where by heat transfer means the vapor phase fraction from separator I via line 18 is cooled and the hydrogen-rich vapor phase fraction from second separation zone II is warmed prior to passage to recycle gas compressor 27, labeled compressor prior to passage via line 28 to a combination step with the hydrocarbon feed in line 3 so that the hydrogen-rich vapor phase fraction and fresh hydrocarbon feed are passed to conversion zone 8 as hereinabove described.

The following example is introduced for the purpose of illustration only with no intention of unduly limiting the generally broad scope of the present invention.

*Example I*

One specific example of the operation of the process of this invention in the presence of a catalyst comprising alumina, platinum and combined halogen is herewith described.

The process is carried out in a manner similar to that set forth hereinabove with reference to the drawing and the catalyst comprises alumina containing 0.375 wt. percent platinum and about 4.6% combined fluorine.

This example illustrates the isomerization of a normal pentane-containing feed stock having a composition of 94.5 mole percent normal pentane, 4.9 mole percent isopentane and 0.6 mole percent $C_6^+$. Referring again to the drawing, this feed stock in the quantity of 3000 barrels per day is passed as a liquid through line 1 and pumped by pump 2 into line 3. Hydrogen-rich recycle gas is admixed with the fresh hydrocarbon feed in line 3 after having been recovered from the process as hereinafter described. The combined feed in line 3, that is, the hydrocarbon in combination with the hydrogen-rich vapor phase fraction produced as hereinafter described, is passed to combined feed heat exchanger 4 and then to charge heater 6 via line 5. The requisite amount of heat for processing is provided by heat transfer means in combined heat exchanger 4 and in charge heater 6. The combined feed then passes to reactor 8 via line 7.

Reactor 8 is loaded in such a manner that the reaction zone has 175 cubic feet of the alumina-platinum-combined fluorine conversion catalyst disposed therein. The reactor is maintained at about 500 p.s.i.g. and has an inlet temperature of about 382° C. A hydrogen to total pentane mole ratio of 2.0 is established so that the combined feed to reactor 8 comprises (in mole percent 64.7% hydrogen, 2.3% methane, 0.4% ethane, 0.1% propane, 0.1% butanes, 2.2% isopentane, 30.1% normal pentane, and 0.1% $C_6^+$. The liquid hourly space velocity is maintained at about 4.0 to obtain the desired conversion. The flow through the reactor in this situation, as illustrated in the drawing, is downflow through the reactor. The reactor effluent contains, in mole percent, 64.6% hydrogen, 2.4% methane, 0.5% ethane, 0.3% propane, 0.3% butanes, 18.0% isopentane, 13.8% normal pentane and 0.1% $C_6^+$. The reactor effluent passes through combined feed heat exchanger 4 via line 9 where the reactor effluent is cooled over 350° C. and, at the same time, the combined feed in combined feed heat exchanger 4, by heat transfer means, is raised in temperature over 280° C. thereby decreasing the total amount of heat input necessary for charge heater 6 to furnish the combined feed prior to the reaction step in reactor 8.

The reactor effluent is then passed to cooler 11 via line 10 where it is further cooled to about 37° C. The cooled reactor effluent is then passed to line 15 via line 12 where a hydrogen-containing makeup gas stream is admixed with the cooled reactor effluent. The makeup gas is furnished to the unit from a reforming unit in this refinery flow scheme and contains (in mole percent) 90.7% hydrogen, 3.7% methane, 2.7% ethane, 2.2% propane and 0.7% butanes. The makeup gas, at a $0.13 \times 10^6$ standard cubic feet per day rate is then boosted in pressure by booster compressor 14 to separator I operating pressure. In the present case, separator I is maintained at about 450 p.s.i.g. and a temperature of about 38° C.

In separator I, a liquid phase fraction enriched in isomerized hydrocarbon and a vapor phase fraction are separated. The liquid phase fraction (295 B/D) is withdrawn via line 17 and its composition in mole percent is as follows: 2.0% hydrogen, 0.8% methane, 0.8% ethane, 1.0% propane, 1.3% butanes, 56.3% isopentane and 37.8% normal pentane. This liquid fraction is then commingled with the liquid fraction from separator II as hereinafter described.

The vapor phase fraction is then passed via line 18 to vapor exchanger 19, hereinafter described, and then to refrigeration means 21, labeled cooler. The composition of the vapor phase fraction to the refrigeration means is, in mole percent, as follows: 90.6% hydrogen, 3.1% methane, 0.5% ethane, 0.2% propane, 0.1% butanes, 3.4% isopentane, and 2.1% normal pentane. Refrigeration means 21, in the present case, has a 47 ton refrigeration duty and refrigerates the vapor phase fraction from separator I to about 4.4° C. The refrigerated vapor phase fraction is then passed via line 22 to separator II which is maintained at about 445 p.s.i.g. and at a temperature less than about 5° C.

In separator II, a liquid phase fraction enriched in isomerized hydrocarbon is separated from a hydrogen-rich vapor phase fraction. The liquid phase fraction (2752 B/D) is withdrawn via line 24 and commingled with the liquid phase fraction from separator I so that 3047 B/D of total product are removed as product from the process. The composition of the total product is, in mole percent, 2.4% hydrogen, 0.6% methane, 0.5% ethane, 0.6% propane, 0.8% butanes, 53.5% isopentane, 41.3% normal pentane and 0.3% $C_6^+$. The total product is then further fractionated to recover the isopentane, through means not shown, or utilized elsewhere in the refinery or petrochemical complex flow scheme as a feed stock to another processing unit.

The hydrogen-rich vapor phase fraction in separator II is then removed via line 25 and passed to vapor exchanger 19 where the vapor phase fraction from separator I is cooled by heat transfer means with the cooled hydrogen-rich vapor phase fraction from separator II to ease the refrigeration duty on refrigeration means 21 prior to passage of the vapor phase fraction from separator I to separator II and, at the same time, to add heat to the hydrogen-rich vapor phase fraction prior to compressing the hydrogen-rich vapor phase fraction to the desired reactor pressure for recycle by means of recycle compressor 27 to the isomerization zone. The hydrogen-rich vapor phase fraction composition, in mole percent, is as follows: 94.5% hydrogen, 3.3% methane, 0.5% ethane, 0.2% propane, 1.0% isopentane and 0.5% normal pentane.

In this manner, the recycle hydrogen to the reactor is upgraded from the 90.7 mole percent originally present in the makeup gas to 94.5 mole percent and, by so doing, the conversion catalyst is now exposed to only a hydrogen-rich vapor phase fraction instead of a relatively low purity hydrogen makeup gas fraction. In this manner, the catalyst is less susceptible to deactivation due to tar and coke formation since substantially no catalyst deactivation is observed. In addition, less impurities are present in the hydrogen furnished to the reactor zone and an outside source of high purity hydrogen is not needed nor are outside hydrogen purification facilities needed so that the refinery or petrochemical complex flow scheme is still made more efficient and economical since a source of hydrogen within the commercial flow scheme itself has been more efficiently utilized.

I claim as my invention:

1. A conversion process which comprises subjecting a hydrocarbon to catalytic conversion in a reaction zone in admixture with a hydrogen-rich gas formed as hereinafter set forth, removing the resultant reaction mixture from said zone and, prior to separating said reaction mixture adding thereto an impure hydrogen makeup gas stream containing a major proportion of hydrogen and a minor proportion of normally gaseous hydrocarbons, separating the mixture thus formed into a liquid fraction and a vapor fraction, refrigerating said vapor fraction to a temperature below about 5° C. and separating a second liquid fraction therefrom, thereby forming a gaseous fraction containing a greater proportion of hydrogen than said makeup gas stream, supplying said gaseous fraction to the reaction zone as said hydrogen-rich gas, and withdrawing said liquid fractions from the process.

2. A conversion process which comprises catalytically isomerizing a hydrocarbon in a reaction zone in admixture with a hydrogen-rich gas formed as hereinafter set forth, removing the resultant reaction mixture from said zone and, prior to separating said reaction mixture adding thereto an impure hydrogen makeup gas stream containing a major proportion of hydrogen and a minor proportion of normally gaseous hydrocarbons, separating the mixture thus formed into a liquid fraction and a vapor fraction, refrigerating said vapor fraction to a temperature below about 5° C. and separating a second liquid fraction therefrom, thereby forming a gaseous fraction containing a greater proportion of hydrogen than said makeup gas stream, supplying said gaseous fraction to the reaction zone as said hydrogen-rich gas, and withdrawing said liquid fractions from the process.

3. The process of claim 2 further characterized in that said hydrocarbon is a saturated hydrocarbon.

4. The process of claim 2 further characterized in that said hydrocarbon is an acyclic paraffin.

5. The process of claim 2 further characterized in that said hydrocarbon is a cyclic paraffin.

6. The process of claim 2 further characterized in that said hydrocarbon is normal pentane.

References Cited by the Examiner

UNITED STATES PATENTS

| | | | |
|---|---|---|---|
| 2,761,819 | 9/1956 | Dinwiddie | 260—683.65 |
| 2,834,823 | 5/1958 | Patton et al. | 260—683.65 |
| 2,915,571 | 12/1959 | Haensel | 260—683.74 |
| 3,078,323 | 2/1963 | Kline et al. | 260—683.68 |
| 3,101,261 | 8/1963 | Skarstrom | 208—99 |
| 3,116,232 | 12/1963 | Nager et al. | 260—683.65 |
| 3,131,235 | 4/1964 | Asselin | 260—683.65 |

DELBERT E. GANTZ, *Primary Examiner.*

V. O'KEEFE, *Assistant Examiner.*